United States Patent [19]

Inoue et al.

[11] Patent Number: 4,663,422

[45] Date of Patent: May 5, 1987

[54] AROMATIC POLYESTERS AND THEIR SHAPED ARTICLES

[75] Inventors: Toshihide Inoue, Ichinomiya; Toshimasa Hirai; Masaru Okamoto, both of Nagoya, all of Japan

[73] Assignee: Director General of the Agency of Industrial Science and Technology, Tokyo, Japan

[21] Appl. No.: 791,340

[22] Filed: Oct. 25, 1985

[30] Foreign Application Priority Data

Oct. 30, 1984 [JP] Japan ................... 59-226771

[51] Int. Cl.$^4$ ............................. C08G 63/60
[52] U.S. Cl. ................... 528/176; 528/193; 528/194; 528/271
[58] Field of Search ............ 528/176, 193, 194, 271

[56] References Cited

U.S. PATENT DOCUMENTS

| | | | |
|---|---|---|---|
| 4,118,372 | 10/1978 | Schaefgen | 528/193 |
| 4,265,802 | 5/1981 | Choe | 528/193 |
| 4,299,756 | 11/1981 | Calundann | 528/193 |
| 4,349,659 | 9/1982 | Kato et al. | 528/193 |
| 4,412,058 | 10/1983 | Siemionko | 528/193 |
| 4,447,593 | 5/1984 | Funakoshi et al. | 528/193 |
| 4,473,682 | 9/1984 | Calundann et al. | 528/193 |
| 4,487,916 | 12/1984 | Irwin | 528/193 |
| 4,529,565 | 7/1985 | Kasatani et al. | 528/193 |
| 4,536,561 | 8/1985 | Schmidt et al. | 528/193 |

Primary Examiner—Lucille M. Phynes
Attorney, Agent, or Firm—Stevens, Davis, Miller & Mosher

[57] ABSTRACT

An aromatic polyester comprising the following structural units [(I)+(II)], [(I)+(II)+(III)], [(I)+(II)+(IV)], [(I)+(III)+(IV)], or [(I)+(II)+(III)+(IV)], the unit (I) occupying 20–85 mol % of all structural units, and a shaped article of a high elastic modulus obtained from the polyester:

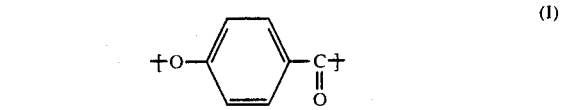

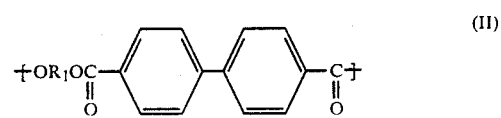

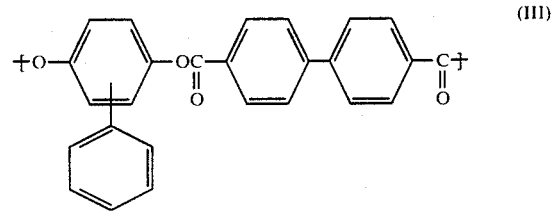

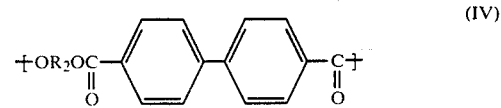

wherein $R_1$ represents one or more groups selected from

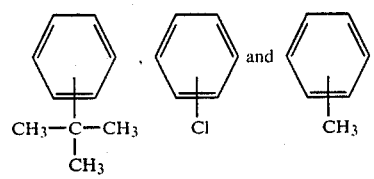

and $R_2$ represents one or more groups selected from

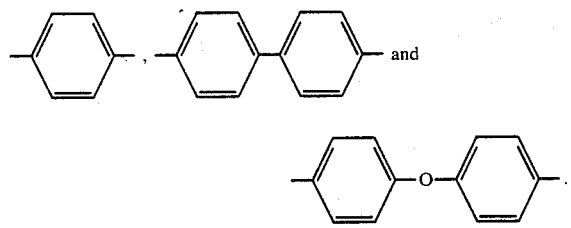

6 Claims, No Drawings

AROMATIC POLYESTERS AND THEIR SHAPED ARTICLES

BACKGROUND OF THE INVENTION

The present invention relates to a novel aromatic polyester capable of being melt-extruded and affording shaped articles having superior mechanical properties and optical anisotropy.

DESCRIPTION OF THE PRIOR ART

Recently, demand for high performance plastics has been increasing and a number of polymers having various novel performances have been developed and marketed. Above all, optically anisotropic liquid crystal polymers having a parallel arrangement of molecular chains have been attracting a special attention in that they have superior mechanical properties (JP-B-55-482).

As such liquid crystal polymers, wholly aromatic polyesters are widely known. For example, homo- and copolymers of p-hydroxybenzoic acid are now available commercially under the trade name "EKONOL". However, this p-hydroxybenzoic acid homopolymer cannot be melt-extruded because its melting point is too high, and studies have been made about the method of lowering its melting point by copolymerizing p-hydroxybenzoic acid with various components. For example, there have been proposed a method of copolymerizing p-hydroxybenzoic acid with phenylhydroquinone, terephthalic acid and/or 2,6-naphthalenedicarboxylic acid (JP-B-55-500215), a method of copolymerizing p-hydroxybenzoic acid with 2,6-dihydroxynaphthalene and terephthalic acid (JP-A-54-50594), and a method of copolymerizing p-hydroxybenzoic acid with 2,6-dihydroxyanthraquinone and terephthalic acid (U.S. Pat. No. 4,224,433). However, aromatic polyesters obtained by these proposed methods are still insufficient in point of elastic modulus of their spun yarns although their melting points are relatively low which are not higher than 400° C. Thus, a further improvement of elastic modulus has been desired.

Having therefore made extensive studies for obtaining optically anisotropic polyesters capable of being melt-extruded and having mechanical properties typified by a high elastic modulus and an optical anisotropy in a well-balanced state, the present inventors found that shaped articles of a high elastic modulus could be obtained from a polyester comprising p-hydroxybenzoic acid, hydroquinone, 4,4'-diphenyldicarboxylic acid and terephthalic acid (JP-A-58-91721), a polyester comprising phenylhydroquinone and 4,4'-diphenyldicarboxylic acid (JP-A-59-41329) and a polyester comprising p-hydroxybenzoic acid, phenylhydroquinone and 4,4'-diphenyldicarboxylic acid (JP-A-59-41328), and filed applications on those polyester. We have further found out that polyesters of such structures as described below can afford a higher elastic modulus, and thus reached the present invention.

SUMMARY OF THE INVENTION

In view of the above circumstances the present inventors have made extensive studies for the purpose of obtaining optically anisotropic polyesters capable of being melt-extruded and affording shaped articles having superior mechanical properties, and as a result we found that polyesters of specific compositions selected from p-hydroxybenzoic acid, hydroquinone, chlorohydroquinone, methylhydroquinone, phenylhydroquinone, t-butylhydroquinone, 4,4'-dihydroxybiphenyl and 4,4'-dihydroxydiphenyl ether, could afford novel optically anisotropic polyesters meeting the above object. In this way the present invention was accomplished.

DESCRIPTION OF THE PREFERRED EMBODIMENTS

The present invention provides an aromatic polyester comprising the following structural units: [(I)+(II)], [(I)+(II)+(III)], [(I)+(II)+(IV)], [(I)+(III)+(IV)], or [(I)+(II)+(III)+(IV)], with the structural unit (I) occupying 20-85 mol % of all structural units:

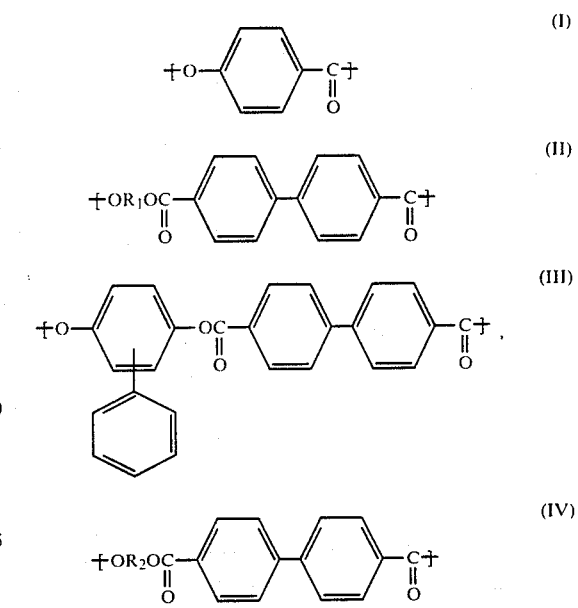

wherein $R_1$ represents one or more groups selected from

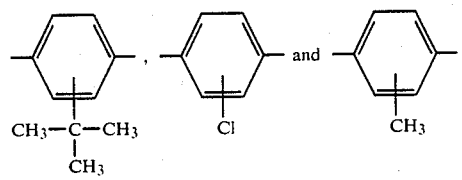

and $R_2$ represents one or more groups selected from

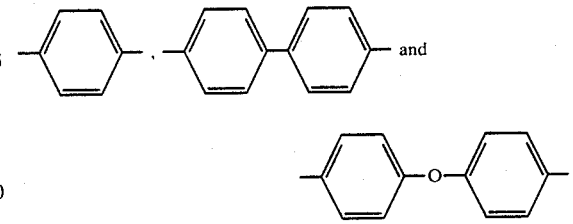

In the aromatic polyester of the present invention, the above structural unit (I) means a structural unit of polyester prepared from p-hydroxybenzoic acid; the structural unit (II) means a structural unit of polyester prepared from an aromatic dihydroxy compound, e.g. t-butylhydroquinone, and 4,4'-diphenyldicarboxylic acid;

the structural unit (III) means a structural unit of polyester prepared from phenylhydroquinone and 4,4'-diphenyldicarboxylic acid; and the structural unit (IV) means a structural unit of polyester prepared from an aromatic dihydroxy compound, e.g. hydroquinone, and 4,4'-diphenyldicarboxylic acid.

The aromatic polyesters of the present invention are in many cases not higher than 400° C. in melting point and can be formed into various shaped articles such as fibers and films having superior mechanical properties easily by a conventional melt extrusion. For example, the melting point of polyethylene terephthalate is 256° C. and that of polyethylene-4,4'-diphenyl carboxylate is 355° C., and since the melting point of polyester becomes higher as the number of benzene nucleus in the structural unit increases, it is presumed that the polyester of the present invention containing 4,4'-diphenylcarboxylic acid as an essential component will become extremely high in melting point. But contrary to such a presumption, the aromatic polyesters of the present invention are relatively low in their melting points which are not higher than 400° C., having a superior melt fluidity. Besides, even in comparison with the polyesters disclosed in the previous JP-A-59-41328 by the present inventors, the aromatic polyesters of the present invention have an advantage of being superior in melt fluidity and elastic modulus despite of their stiff structure. Such a new effect is not inferable at all from the conventional knowledge.

In the aromatic polyester of the present invention, the proportion of the structural unit (I) is 20–85 mol %, preferably 30–80 mol %, of the whole. If it is less than 20 mol % or more than 85 mol % of the whole, the fluidity will become poor and thus such values are not desirable.

The aromatic dihydroxy component which forms the structural unit (II) represents one or more members selected from t-butylhydroquinone, chlorohydroquinone and methylhydroquinone, and the aromatic dihydroxy component which forms the structural unit (IV) represents one or more members selected from hydroquinone, 4,4'-dihydroxybiphenyl and 4,4'-dihydroxydiphenyl ether.

In polycondensation for preparation of the aromatic polyesters of the present invention, in addition to the components which constitute the structural units (I), (II), (III) and (IV) there also may be used aromatic dicarboxylic acids such as terephthalic acid, isophthalic acid, 1,2-bis(phenoxy)ethane-4,4'-dicarboxylic acid, 1,2-bis(2-chlorophenoxy)ethane-4,4'-dicarboxylic acid and 2,6-naphthalenedicarboxylic acid, alicyclic dicarboxylic acid and 2,6-naphthalenedicarboxylic acid, alicyclic dicarboxylic acids such as hexahydroterephthalic acid, other aromatic diols such as 2,6-dihydroxynaphthalene, and other aromatic hydroxycarboxylic acids such as m-hydroxybenzoic acid, 2,6-hydroxynaphthoic acid, p-aminophenol and p-aminobenzoic acid. These additional components may be used in a small proportion not impairing the object of the present invention. Most preferred is terephthalic acid or 1,2-bis(2-chlorophenoxy)ethane-4,4'-dicarboxylic acid in an amount of less than 30 mol % per 100 mol % of 4,4'-diphenyldicarboxylic acid.

The aromatic polyesters of the present invention can be prepared according to a conventional polyester polycondensation process, and no special limitation is placed on how to prepare them. But the following methods (1) to (3) are mentioned as typical examples.

(1) Preparation by polycondensation involving removal of monocarboxylic acid, from p-acetoxybenzoic acid, diester of an aromatic dihydroxy compound such as t-butylhydroquinone diacetate or t-butylhydroquinone dipropionate, and an aromatic dicarboxylic acid which is mainly 4,4'-diphenyldicarboxylic acid.

(2) Preparation by polycondensation involving removal of phenol, from phenyl ester of p-hydroxybenzoic acid, an aromatic dihydroxy compound such as t-butylhydroquinone, and diphenyl ester of an aromatic dicarboxylic acid which is mainly 4,4'-diphenyldicarboxylic acid.

(3) Preparation by polycondensation involving removal of phenol, which comprises reacting a desired amount of diphenyl carbonate with p-hydroxybenzoic acid and an aromatic dicarboxylic acid which is mainly 4,4'-diphenyldicarboxylic acid to obtain respective diphenyl esters and then adding an aromatic dihydroxy compound such as t-butylhydroquinone.

Typical examples of catalyst used in the polycondensation reaction are metallic compounds such as stannous acetate, tetrabutyl titanate, lead acetate, sodium acetate, potassium acetate and antimony trioxide. These metallic compounds are effective especially in the polycondensation involving removal of phenol.

Many of the aromatic polyesters of the present invention permit measurement of a logarithmic viscosity in pentafluorophenol, which viscosity is preferably not smaller than 0.35, more preferably 0.4 to 15.0, as a value measured at a concentration of 0.1 (wt/vol) % and at 60° C.

The melt viscosity of the aromatic polyester of the present invention is preferably in the range of 10 to 15,000 poise, more preferably 20 to 5,000 poise. It is a value measured by a Koka type flow tester at a temperature of (liquid crystal initiation temperature +40° to 90° C.) and at a shear velocity of 2,000 to 4,000 (1/sec).

Shaped articles obtained from the polyester of the invention can be enhanced in strength by heat treatment and their elastic modulus can also be increased by such treatment in many cases.

The heat treatment may be effected by heat-treating the shaped articles at a temperature not higher than the polymer melting point in an inert atmosphere (e.g. nitrogen, argon, helium or steam) or in an oxygen-containing atmosphere (e.g. air). It can be carried out in several minutes to several days no matter whether under tension or not under tension.

Shaped articles obtained from the novel aromatic polyester of the invention have a good optical anisotropy which is attributable to the parallel molecular array of the polyester, and are extremely superior in mechanical properties.

The aromatic polyester of the present invention thus prepared, having a low melting point not higher than 400° C., can be subjected to conventional melt processings such as extrusion molding, injection molding, compression molding and blow molding, and thereby formed into fibers, films, three-dimensional products, containers and hoses.

Additives such as reinforcing agents, e.g. glass fibers, carbon fibers and asbestos, fillers, nucleating agents, pigments, antioxidants, stabilizers, plasticizers, lubricants, mold release agents and flame retardants, as well as other thermoplastic resins, may be added to the aromatic polyester of the present invention at the time of molding to impart desired characteristics to the resulting shaped articles.

The following examples are given to further illustrate the invention.

EXAMPLE 1

37.8 g ($21 \times 10^{-2}$ mol) of p-acetoxybenzoic acid, 16.2 g ($7.0 \times 10^{-2}$ mol) of chlorohydroquinone diacetate, 18.9 g ($7.0 \times 10^{-2}$ mol) of phenylhydroquinone diacetate and 33.8 g ($14 \times 10^{-2}$ mol) of 4,4'-diphenyldicarboxylic acid were charged into a test tube for polymerization and reacted at 200°–300° C. in a nitrogen gas atmosphere for 2.7 hours, then the pressure was reduced to a vacuum degree of 1.3 mmHg and heating was continued at 320°–330° C. for 1.3 hours to allow polycondensation reaction to proceed. As a result, almost theoretical amount of acetic acid was distilled out to obtain a highly fibrillated gray polymer.

The polymer was of the following theoretical structural formula, and elementary analysis values of the polyester well coincided with theoretical values as shown in Table 1.

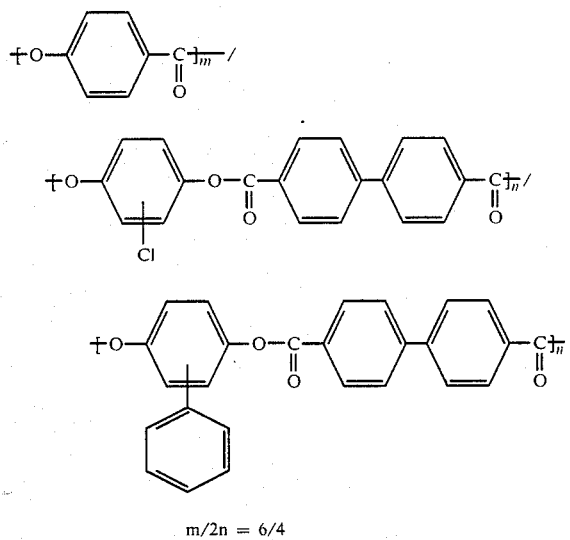

m/2n = 6/4

TABLE 1

| | Observed Value (wt %) | Theoretical Value (wt %) |
|---|---|---|
| C | 73.5 | 72.9 |
| H | 3.2 | 3.6 |
| Cl | 2.8 | 3.2 |
| O | 20.5 | 20.3 |

The polyester was put on a sample stand of a polarizing microscope, then the temperature was raised and anisotropic melt temperature was determined by the starting temperature of stir opalescence.

As a result, the polyester exhibited a good optical anisotropy at the temperature not lower than 261° C. The polyester was charged to a Koka type flow tester and spun through a spinneret 0.3 mm in diameter at a spinneret temperature of 320° C. with the take-up velocity of 220 m/min to obtain a spun yarn 0.07 mm in diameter.

Modulus of spun yarn was measured by RHEOVIBRON DDV-II-EA (a product of Toyo Baldwin Co., Ltd.) at a frequency of 110 Hz, a heating rate of 2° C./min and an interchuck distance of 40 mm; as a result, it was found to have a modulus as high as 104 GPa at 30° C. The melt viscosity of the polyester was 3,000 poise at a shear rate of 3,000 (1/sec).

EXAMPLE 2

226.8 g ($12.6 \times 10^{-1}$ mol) of p-acetoxybenzoic acid, 97.2 g ($4.2 \times 10^{-1}$ mol) of chlorohydroquinone diacetate, 113.4 g ($4.2 \times 10^{-1}$ mol) of phenylhydroquinone diacetate and 202.8 g ($8.4 \times 10^{-1}$ mol) of 4.4 diphenyldicarboxylic acid were charged in a test tube for polymerization and reacted at 200°–320° C. in a nitrogen gas atmosphere for 2.7 hours, then the pressure was reduced to a vacuum degree of 0.4–0.6 mmHg and heating continued at 320°–330° C. for 1.5 hours to allow polycondensation reaction to proceed.

The polyester exhibited a good optical anisotropy at temperatures not lower than 261° C. The melt viscosity of the polyester was 3,000 poise at a shear rate of 3,000 (1/sec) and 330° C.

Moreover, the polymer was injection-molded at 310°–320° C. (molded 30° C.) using Sumitomo NESTAL injection molding machine (0.5 ounce) to obtain test specimens having a thickness of ⅛" and 1/32".

Bending modulus of these test specimens were measured by TENSILON UTM-4 (a product of Toyo Baldwin Co., Ltd.) in accordance with ASTM D790; as a result, it was found to have bending modulus as high as 19.7 GPa (⅛") and 34.8 GPa (1/32") respectively.

Moreover, these test specimens were heat-treated at the temperature of 150° C. for 2 hours, then further heat-treated at the temperature of 180° C. for 18 hours. Bending modulus of these test specimens were measured; as a result, it was found to be increased bending modulus as high as 20.7 GPa (⅛") and 41.6 GPa (1/32") respectively.

EXAMPLE 3

21.6 g ($12 \times 10^{-2}$ mol) of p-acetoxybenzoic acid, 10.0 g ($4 \times 10^{-2}$ mol) of t-butylhydroquinone diacetate, 10.8 g ($4 \times 10^{-2}$ mol) phenylhydroquinone diacetate and 19.4 g ($8 \times 10^{-2}$ mol) of 4,4'-diphenyldicarboxylic acid were charged into a test tube for polymerization and reacted at 250°–350° C. in a nitrogen gas atmosphere for 3.0 hours, then the pressure was reduced to a vacuum degree of 1.0 mmHg and heating was continued at 330°–350° C. for 1.0 hours to allow polycondensation reaction to proceed. As a result, almost theoretical amount of acetic acid was distilled out to obtain a highly fibrillated brown polymer. The polymer was of the following theoretical structural formula, and elementary analysis values of the polyester well coincided with theoretical values as shown in Table 2.

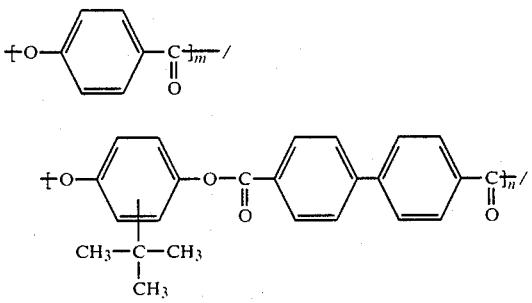

-continued

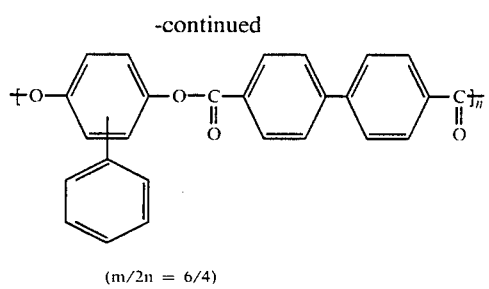

(m/2n = 6/4)

TABLE 2

| | Observed Value (wt %) | Theoretical Value (wt %) |
|---|---|---|
| C | 76.1 | 75.8 |
| H | 3.7 | 3.8 |
| O | 45.1 | 44.5 |

The polyester was put on a sample stand of a polarizing microscope, then the temperature was raised and anisotropic melt temperature was determined by the starting temperature of stir opalescence.

As a result, the polyester exhibited a good optical anisotropy at the temperature not lower than 233° C.

Further, the polyester was measured for thermal characteristics by means of a differential scanning calorimeter (PERKIN-ELMER DSC-2C) to obtain the following results: glass transition temperature 166° C.

Moreover, the polyester was charged to a Koka type flow tester and spun through a spinneret 0.3 mm in diameter at the spinneret temperature of 340° C. with the take-up velocity of 78 m/min to obtain a spun yarn 0.06 mm in diameter.

Modulus of spun yarn was measured by RHEOVIBRON DDV-II-EA (a product of Toyo Baldwin Co., Ltd.) at a frequency of 110 Hz, a heating rate of 2° C./min and an interchuck distance of 40 mm, as a result, it was found to have a modulus as high as 87 GPa at 30° C.

The melt viscosity of the polyester was 100 poise at a shear rate of 3,000 (1/sec).

EXAMPLE 4

6.48 g (3.6×10 mol) of p-acetoxybenzoic acid, 2.33 g (1.2×10 mol) of hydroquinone diacetate, 3.0 g (1.2×10⁻² mol) of t-butylhydroquinone diacetate and 5.81 g (2.4×10⁻² mol) of 4,4'-diphenyldicarboxylic acid were charged into a polymerizing test tube and a polymerization involving removal of acetic acid was performed as follows.

First, reaction was allowed to take place in a nitrogen gas atmosphere at 250°-350° C. for 3.0 hours, then the pressure was reduced to 0.5 mmHg at 350° C. and the reaction was allowed to further proceed for 1.0 hours to complete polycondensation; as a result, an almost theoretical amount of acetic acid was distilled out to obtain a brown polymer.

The polymer, having the following theoretical structural formula, was subjected to elementary analysis, results of which well coincided with theoretical values as shown in Table 3. Further, the polymer was measured for thermal characteristics by means of a differential scanning calorimeter (PERKIN-ELMER DSC-2C); as a result, it was found to have a melting point of 265° C.

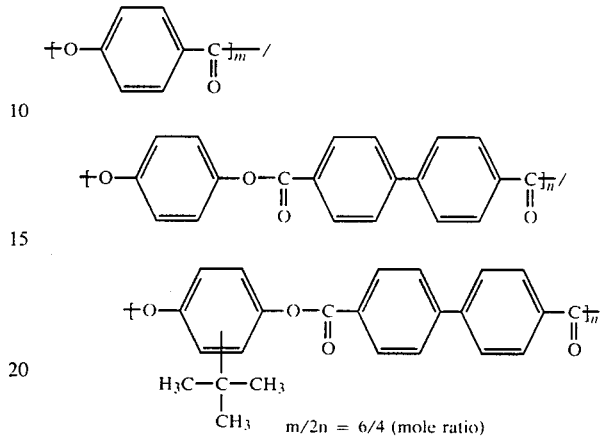

m/2n = 6/4 (mole ratio)

TABLE 3

| | Observed Value (wt %) | Theoretical Value (wt %) |
|---|---|---|
| C | 76.0 | 76.2 |
| H | 4.2 | 4.4 |
| O | 19.8 | 19.4 |

The oxygen content was calculated as (100% - C% - H%).

The polyester was put on a sample stand of a polarizing microscope, then the temperature was raised and a check was made on optical anisotropy under shear; as a result, the liquid crystal initiation temperature was 260° C. and a good optical anisotropy was observed.

Further, the polyester was charged to a flow tester and spun through a spinneret 0.3 mm in diameter at a spinning temperature of 340° C. to obtain a spun yarn 0.08 mm in diameter. Its melt viscosity was 1,800 poise at a shear rate of 2,500 (1/sec).

The thus-spun yarn was measured for elastic modulus at a frequency of 110 Hz, a heating rate of 2° C./min and an interchuck distance of 40 mm by means of RHEOVIBRON DDV-II-EA (a product of Toyo Baldwin Co., Ltd.); as a result, it was found to have an extremely high elastic modulus of 108 GPa at 30° C.

EXAMPLES 5-9

21.6 g (12×10⁻² mol) of p-acetoxybenzoic acid (I), diacetate components (8×10⁻² mol) which are chlorohydroquinone diacetate (II), methylhydroquinone diacetate (III), phenylhydroquinone diacetate (IV) and 4,4'-diacetoxybiphenyl (V), and 4,4'-diphenyldicarboxylic acid (VI), were charged into a test tube for polymerization and a polycondensation reaction was conducted under the same conditions as in Example 1. After measuring liquid crystal initiation temperatures, a melt spinning was performed.

From Table 4 it is seen that the polyesters obtained are extremely good in fluidity and afford spun yarns of a high elastic modulus.

TABLE 4

| Diacetate Component ($\times 10^{-2}$ mol) | | | | | Liquid Crystal Initiation Temperature (°C.) | Spinning Temperature (°C.) | Melt Viscosity[1] (poise) | Elastic Modulus (GPa) |
|---|---|---|---|---|---|---|---|---|
| (II) | (III) | (IV) | (V) | (VI) | | | | |
| 5 | 4 | 4 | — | — | — | 240 | 340 | 2000 | 29 |
| 6 | — | 4 | 4 | — | — | 270 | 330 | 500 | 91 |
| 7 | — | 4 | — | 4 | — | 267 | 310 | 40 | 56 |
| 8 | 4 | — | — | 4 | — | 240 | 290 | 1000 | 49 |
| 9 | — | — | 4 | 4 | — | 237 | 310 | 1000 | 57 |

[1]Values measured at the spinning temperatures and at a shear rate of 3,000 (1/sec)

EXAMPLES 10–14

21.6 g ($12 \times 10^{-2}$ mol) of p-acetoxybenzoic acid, diacetate components ($8 \times 10^{-2}$ mol) which are t-butylhydroquinone diacetate (II), chlorohydroquinone diacetate (III), methylhydroquinone diacetate (IV), 4,4'-diacetoxybiphenyl (V) and 4,4'-diacetoxydiphenyl ether (VI), and 4,4'-diphenyldicarboxylic acid (VII) ($8 \times 10^{-2}$ mol), were charged into a test tube for polymerization and a polycondensation reaction was conducted under the same conditions as in Example 1. Then, liquid crystal initiation temperatures and melt viscosities were measured.

As to the polymer obtained in Example 10, its glass transition temperature was measured by a differential scanning calorimeter, which was found to be 143° C. The polymer was then spun through a spinneret 0.3 mm in diameter at a spinning temperature of 350° C., followed by winding at a rate of 26 m/min, to obtain a spun yarn 0.09 mm in diameter. The spun yarn was measured for elastic modulus by means of RHEOVIBRON under the same conditions as in Example 1, which was found to be as high as 75 GPa at 30° C.

TABLE 5

| Example | Diacetate Component ($x\ 10^{-2}$ mol) | | | | | Liquid Crystal Initiation Temperature (°C.) | Melt Viscosity[1] (poise) |
|---|---|---|---|---|---|---|---|
| | (II) | (III) | (IV) | (V) | (VI) | | |
| 10 | 4 | 4 | — | — | — | 264 | 600 |
| 11 | 4 | — | 4 | — | — | 274 | 500 |
| 12 | 4 | — | — | 4 | — | 282 | 400 |
| 13 | 4 | — | — | — | 4 | 235 | 600 |
| 14 | 8 | — | — | — | — | 247 | 2400 |

[1]Values measured at the liquid crystal initiation temperatures plus (50 to 100° C.) and at a shear rate of 3,000 (1/sec)

EXAMPLES 15–25 p-Acetoxybenzoic acid (I), chlorohydroquinone diacetate (II), methylhydroquinone diacetate (III), 4,4'-diphenyldicarboxylic acid (IV), terephthalic acid (V), 1,2-bis(2-chlorophenoxy)ethane-4,4'-dicarboxylic acid (VI) and 2,6-dicarboxynaphthalene (VII) were charged (at a molar ratio 1 to 1 of components (II)–(III) to components (IV)–(VII)) into a test tube for polymerization and a polycondensation reaction was conducted under the same conditions as in Example 1.

The obtained polymers exhibited a good optical anisotropy at below 400° C. as shown in Tables 6 and 7. Some of the polymers were measured for melting point by means of a differential scanning calorimeter. As to the polymers obtained in Examples 19 and 20, they were measured for elastic modulus by means of RHEOVIBRON after melt spinning. As a result, extremely high elastic moduli of 106 and 127 GPa were observed at fiber diameters of 0.13 and 0.07 mm, respectively, at 30° C.

TABLE 6

| | Feed Composition (molar number) | | | | | | |
|---|---|---|---|---|---|---|---|
| | (I) | (II) | (III) | (IV) | (V) | (VI) | (VII) |
| Example 15 | 0.08 | 0.02 | — | 0.02 | — | — | — |
| Example 16 | 0.06 | 0.04 | — | 0.04 | — | — | — |
| Example 17 | 0.03 | 0.07 | — | 0.07 | — | — | — |
| Example 18 | 0.03 | 0.07 | — | 0.063 | 0.007 | — | — |
| Example 19 | 0.03 | 0.07 | — | 0.056 | 0.014 | — | — |
| Example 20 | 0.015 | 0.085 | — | 0.068 | 0.017 | — | — |
| Example 21 | 0.07 | — | 0.03 | 0.03 | — | — | — |
| Example 22 | 0.05 | — | 0.05 | 0.05 | — | — | — |
| Example 23 | 0.03 | — | 0.07 | 0.07 | — | — | — |
| Example 24 | 0.05 | 0.05 | — | 0.045 | — | 0.005 | — |
| Example 25 | 0.05 | 0.05 | — | 0.045 | — | — | 0.005 |

TABLE 7

| | (I) to (II), (III) (mol ratio) | (IV) to (V)–(VIII) (mol ratio) | Liquid Crystal Initiation Temperature (°C.) | Melting Point (°C.) | Melt Viscosity*[1] (poise) |
|---|---|---|---|---|---|
| Example 15 | 8/2 | 10/0 | 293 | 303 | 5100 |
| Example 16 | 6/4 | 10/0 | 276 | — | 4500 |
| Example 17 | 3/7 | 10/0 | 238 | 269 | 350 |
| Example 18 | 3/7 | 9/1 | 284 | 274 | 800 |
| Example 19 | 3/7 | 8/2 | 256 | — | 700 |
| Example 20 | 1.5/8.5 | 8/2 | 287 | 290 | 800 |
| Example 21 | 7/3 | 10/0 | 274 | — | 6000 |
| Example 22 | 5/5 | 10/0 | 278 | — | — |
| Example 23 | 3/7 | 10/0 | 270 | — | — |
| Example 24 | 5/5 | 9/1 | 256 | — | 3200 |
| Example 25 | 5/5 | 9/1 | 278 | — | 3800 |

*[1]Values measured at temperatures of (liquid crystal initiation temperatures +60° C.) and at a shear rate of 3,000 (1/sec)

EXAMPLES 26–34 AND COMPARATIVE EXAMPLES 1–3

Diacetate components which are p-acetoxybenzoic acid (I), hydroquinone diacetate (II), chlorohydroquinone diacetate (III), methylhydroquinone diacetate (IV), phenylhydroquinone diacetate (V), tertbutylhydroquinone diacetate (VI) and 4,4'-dihydroxybiphenyl (VII), and dicarboxylic acid components which are 4,4'-diphenyldicarboxylic acid (VIII), 2,6-naphthalenedicarboxylic acid (IX), 1,2-bis(2-chlorophenoxy)ethane-4,4'-dicarboxylic acid (X), 1,2-bis(phenoxy)ethane-4,4'-dicarboxylic acid (XI) and terephthalic acid (XII), were combined as shown in Table 8 and charged into a test tube for polymerization at a molar ratio 1 to 1 of diacetate components to dicarboxylic acid components and a polycondensation reaction was performed in the same way as in Example 1. Then, a check was made on optical anisotropy of the polymers obtained; as a result, all the polyesters (Examples 26–34) obtained according to the present invention were found to exhibit a good optical anisoropy as shown in Table 8.

On the other hand, the other polyesters (Comparative Examples 1–3) than those of the present invention were high in melting point or in melt viscosity and thus poor in fluidity.

The polyester obtained in Example 28 was charged to a flow tester and spun through a spinneret 0.3 mm in diameter at a spinning temperature of 350° C. to obtain a spun yarn 0.08 mm in diameter at a take-up rate of 23.8 m/min. This spun yarn was measured for elastic modulus by means of RHEOVIBRON, which was found to be as high as 106 GPa at 30° C.

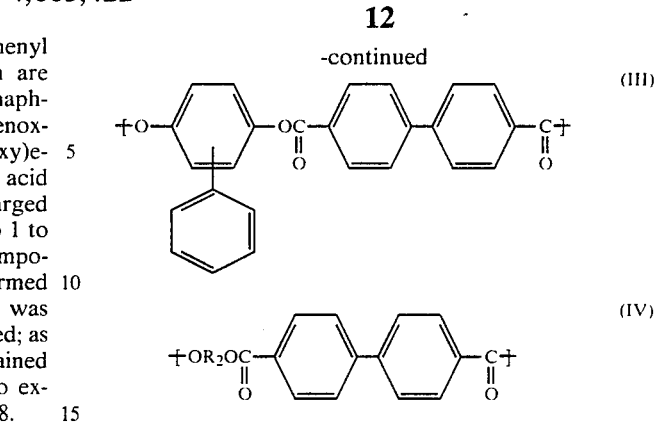

wherein $R_1$ represents one or more groups selected from

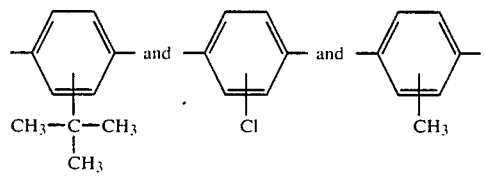

TABLE 8

| | p-Hydroxy-benzoic Acid (mol %) | Dihydroxy Component (mol %) | | | | | | Dicarboxylic Acid Component (mol %) | | | | | Liquid Crystal Initiation Temperature (°C.) | Melt Viscosity[1] (poise) |
|---|---|---|---|---|---|---|---|---|---|---|---|---|---|---|
| | (I) | (II) | (III) | (IV) | (V) | (VI) | (VII) | (VIII) | (IX) | (X) | (XI) | (XII) | | |
| Example | | | | | | | | | | | | | | |
| 26 | 60 | 20 | 20 | | | | | 40 | | | | | 278 | 2,100 |
| 27 | 60 | 20 | | 20 | | | | 40 | | | | | 270 | 1,600 |
| 28 | 30 | 35 | | | 35 | | | 70 | | | | | 308 | 3,000 |
| 29 | 30 | 35 | | | | 35 | | 70 | | | | | 316 | 3,200 |
| 30 | 60 | 20 | | | | | 20 | 40 | | | | | 303 | 2,000 |
| 31 | 50 | 50 | | | | | | 35 | 15 | | | | 283 | 1,900 |
| 32 | 50 | 50 | | | | | | 35 | | 15 | | | 255 | 1,300 |
| 33 | 50 | 50 | | | | | | 35 | | | 15 | | 257 | 1,200 |
| 34 | | 30 | | | | 70 | | 70 | | | | 30 | 327 | 3,400 |
| Comparative Example | | | | | | | | | | | | | | |
| 1 | | 100 | | | | | | 100 | | | | | 500< | unmeasurble |
| 2 | 60 | 40 | | | | | | 40 | | | | | 500< | |
| 3 | | 40 | | 60 | | | | | | | | 100 | 379 | above 15,000 poise even at 400° C. |

[1]Values measured at temperatures of (liquid crystal initiation temperatures +40 to 100° C.) and at a sheer rate of 2,000 to 4,000 (1/sec)

What is claimed is:

1. An aromatic polyester comprising the following structural units [(I)+(II)], [(I)+(II)+(III)], [(I)+(II)+(IV)], [(I)+(III)+(IV)], or [(I)+(II)+(III)+(IV)], the unit (I) occupying 20–85 mol % of all structural units:

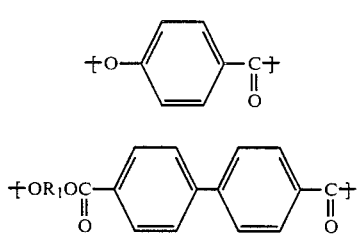

and $R_2$ represents one or more groups selected from

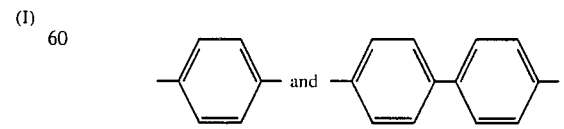

2. A polyester as set forth in claim 1, wherein the structural unit (I) occupies 30–80 mol % of the whole.

3. A polyester as set forth in claim 1, consisting essentially of the structural units [(I)+(II)] wherein $R_1$ is

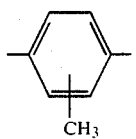
4. A polyester as set forth in claim 1, consisting essentially of the structural units [(I)+(II)+(III)] wherein $R_1$ is
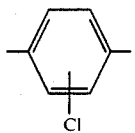
5. A polyester as set forth in claim 1, consisting essentially of the structural units [(I)+(II)+(IV)] wherein $R_1$ is
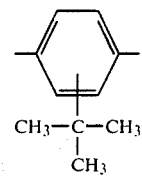
and $R_2$ is
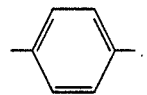
6. A polyester as set forth in claim 1, consisting essentially of the structural units [(I)+(III)+(IV)] wherein $R_2$ is
* * * * *